United States Patent [19]

Munro

[11] Patent Number: 4,597,821
[45] Date of Patent: Jul. 1, 1986

[54] PORTABLE EDGE BANDER FOR HAND HELD AND TABLE MOUNTED OPERATION

[76] Inventor: Alick R. Munro, 1055 Greg St., Sparks, Nev. 89431

[21] Appl. No.: 526,844

[22] Filed: Aug. 26, 1983

[51] Int. Cl.[4] .................. B32B 31/00; B44C 7/00; B29B 1/00
[52] U.S. Cl. .................... 156/500; 156/475; 156/499; 156/577; 156/579; 118/207; 222/146.2
[58] Field of Search ............... 156/500, 510, 577, 573, 156/578, 579, 391, 547, 543, 524, 523, 475, 499; 222/146.5, 146.2; 118/202, 207, 217; 425/87, 90, 508

[56] References Cited

U.S. PATENT DOCUMENTS

| | | | |
|---|---|---|---|
| 3,188,262 | 6/1965 | Torrison | 156/575 |
| 3,445,315 | 5/1969 | Strauss | 156/575 |
| 3,707,427 | 12/1972 | Erickson | 156/578 |
| 3,713,947 | 1/1973 | Hawkins | 156/500 |
| 3,886,011 | 5/1975 | Eigenmann | 156/575 |
| 4,056,423 | 11/1977 | Hughes | 156/575 |
| 4,067,762 | 1/1978 | Rhoads | 156/577 |
| 4,075,053 | 2/1978 | Adams | 156/391 |
| 4,090,914 | 5/1978 | Hauk et al. | 156/575 |
| 4,103,472 | 8/1978 | Heringer | 156/391 |
| 4,178,876 | 12/1979 | Nicklas et al. | 118/666 |
| 4,196,028 | 4/1980 | Mills et al. | 156/577 |
| 4,222,812 | 9/1980 | Duewel | 156/510 |
| 4,358,337 | 11/1982 | Johnson et al. | 156/524 |

Primary Examiner—Edward Kimlin
Assistant Examiner—L. Falasco
Attorney, Agent, or Firm—Sughrue, Mion, Zinn, Macpeak, and Seas

[57] ABSTRACT

A hand held, trigger operated, adhesive hot melt gun slidably mounts a base plate parallel with the gun axis with the plate spring biased forwardly in the direction of a hot melt adhesive discharge nozzle at the end of the gun remote from the trigger. An L-shaped extrusion tip carried by said nozzle includes a series of small diameter holes forming a vertical array within an upright leg which leg contacts an edge of a panel during sweep of the extrusion tip across the edge to deposit linear beads of melted adhesive thereon. The band, which may be mounted within a magazine on the base plate, feeds across the back edge of the extrusion tip to contact the adhesive coated panel edge downstream of the adhesive application point at a point where it is tacky. A spring biased pressure roller mounted to the base plate or otherwise presses the band against the tacky adhesive at this point during relative sweep of the apparatus along the edge of the panel. The apparatus may be removably mounted to a table and maintained fixed while the panel edge is run across the table top with its edge pressed against the extrusion tip and one or more pressure rollers.

9 Claims, 8 Drawing Figures

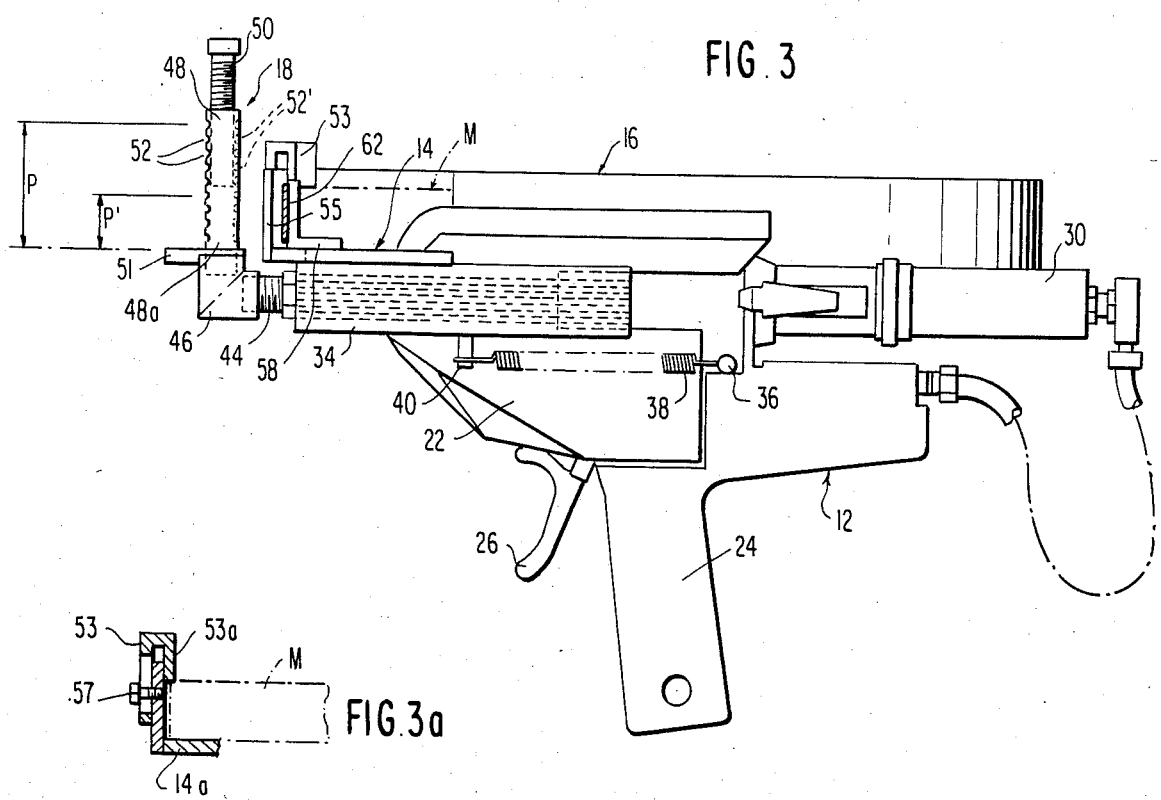
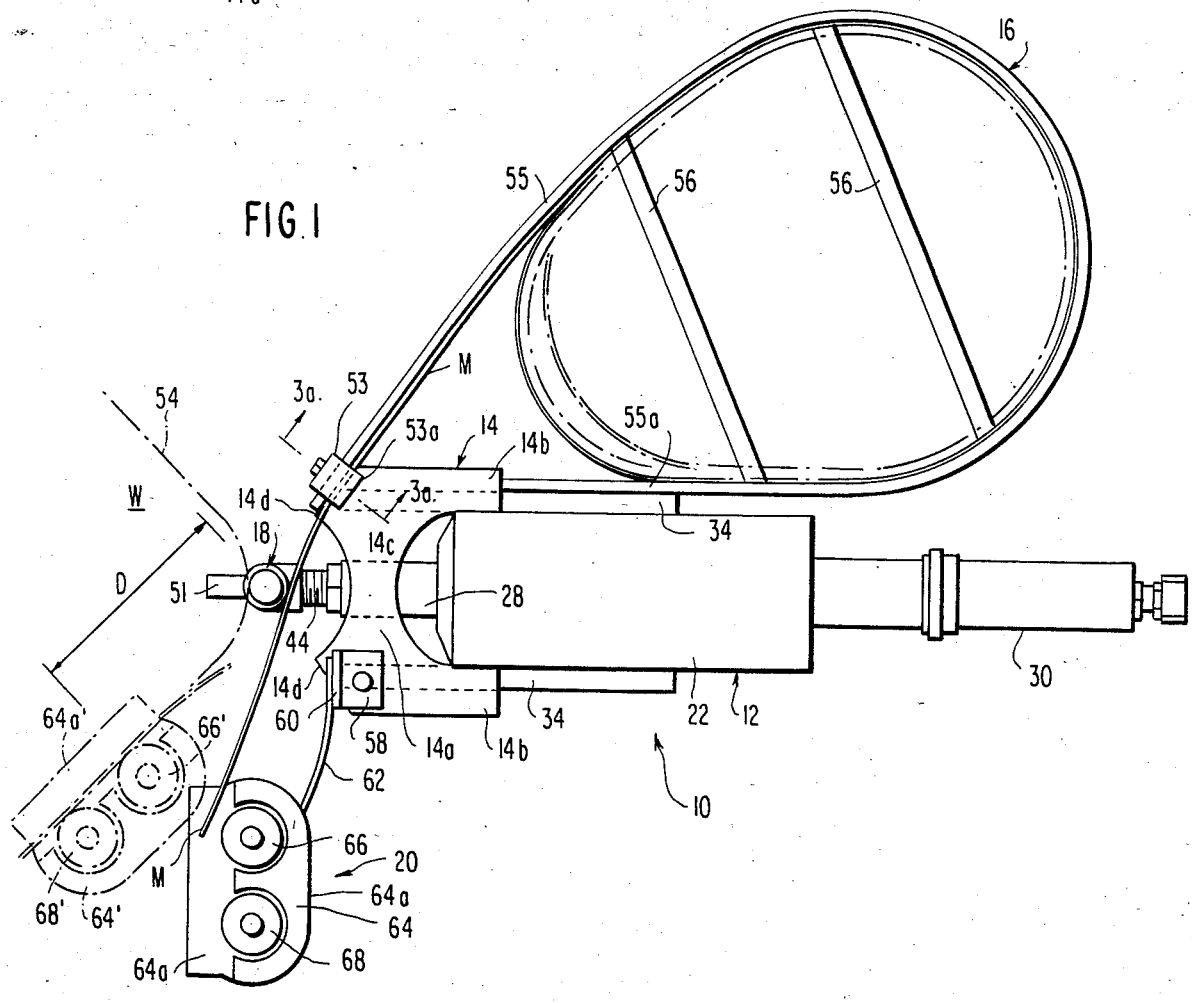

PORTABLE EDGE BANDER FOR HAND HELD AND TABLE MOUNTED OPERATION

FIELD OF THE INVENTION

This invention relates to a portable apparatus for applying a decorative band to an edge of a panel and, more particularly, to a hand held apparatus which is alternatively fixable to a table top and which applies by means of a hot melt adhesive gun, melted adhesive to the table edge prior to contact of the band with the adhesive coated panel edge downstream of the point of adhesive application and after the adhesive becomes tacky.

BACKGROUND OF THE INVENTION

Edges of various panels including sawn lumber, plywood, composition material, particularly in cabinet making, require covering with strips or bands of a material to improve appearance, conceal irregularities or add durability to the manufactured product.

U.S. Pat. No. 4,222,812 to Duewel discloses an edge banding machine which is table mounted. The machine utilizes a heater for heating hot air which in turn is blasted against a preglued edge band strip coated with high viscosity hot melt glue, whereupon after the glue is melted, the banding material is pressed against the edge of the panel as the glue cures. In such machine, the panel is moved longitudinally in a relatively straight line in contact with a spindle which positions the edge band relative to the edge of the panel and wherein the panel is pressed so as to sandwich the edge band between the spindle and the panel edge with the melted glue surface in contact with the panel edge.

U.S. Pat. No. 4,067,762 to Rhoads discloses a hand held, i.e. portable edge bander which includes a thermostatically controlled electric heater for melting preglued tape-like trim whereby the tape is preheated by the heater as the operator moves the machine along the edge of the panel to be covered. The tape is stored above the working surface of the hand held implement and transported by a series of rollers to the underside of a plate, at which point it is bonded onto the working surface edge.

Such apparatus have not proven satisfactory since the heaters tend to scorch the banding material, cause bubbling of the adhesive if the period of contact is excessive, and require that the workpiece be moved through the apparatus or the apparatus move relative to the workpiece at a more or less constant rate, requiring a skilled operator. Further, there is difficulty in readily stopping or starting the procedure.

Rather complicated, large and expensive machinery has been developed in which the adhesive is melted and applied in liquid form to the edge of the panel to be banded and which involve mechanisms for positively driving both the panel to be banded and the band or strip itself. Such machinery, in addition to being expensive, involves the difficulty of synchronizing the movement of the panel being edge-banded to the band material itself. Further, the adhesive, which is applied in liquid form, immediately prior to the application of the edge band, requires significant drying or curing time which is both time consuming and expensive, and often the adhesive seeps between the band and the panel edge resulting in contamination of the machine parts and spoiling the decorative appearance of the banded panel. One such machine is sold under the trademark HOLZ-HER and is manufactured by the Carl M. Reich Maschinfabrik Gmbh, Nurtingen, West Germany.

In an effort to assist the cabinetmaker in applying hot melt adhesive to a panel edge or to a band prior to bonding to the panel edge, or both, the Minnesota Mining and Manufacturing Company of St. Paul, Minn., has developed a hot melt adhesive applicator gun under the trademark POLYGUN II which is effective in applying JET-MELT brand hot melt adhesive. The adhesive, which is a 100 percent solid, solvent-free, thermoplastic resin, becomes fluid when heated, adequately wets the substrate, and when cooled, hardens without chemical change, forming a strong bond to most wood surfaces such as wood, plastic, foam, fabric, cardboard, ceramics, plastic, etc. The adhesive applicator gun is light weight, has a true gun handle with a trigger mechanism at the leading edge of the handle beneath the electrical melting system, and is characterized by a straight through design nozzle which discharges the hot melt adhesive in liquid form through a small diameter bore within the nozzle.

It is, therefore, a primary object of the present invention to provide an improved, low cost, and simplified apparatus for applying a continuous band of material to the edge of a panel and which incorporates within that apparatus a hot melt adhesive applicator gun such as the commercially available applicator gun of the Minnesota Mining and Manufacturing Company.

It is a further object of the present invention to provide an improved hot melt plastic gun type panel edge banding apparatus in which the gun is carried by a floating mount to pressure the extrusion tip into substrate contact, insures a thin glue line on the finished product, reduces glue consumption and eliminate product clean-up, and which eliminates the need for automatic feed of either the panel or band or automatic trimming of the band subsequent to band application.

It is a further object of the present invention to provide an improved hot melt adhesive gun type panel edge banding apparatus characterized by a hand held device featuring a material magazine and edge guide that can be quick connected or disconnected to and from a table module, and wherein hand movement of the panel across the table top effects in a simplified and direct manner operation of the hot melt adhesive applicator gun and controlled synchronous frictional movement of the band into contact with the panel edge downstream of the adhesive extrusion area.

SUMMARY OF THE INVENTION

The present invention is directed to an apparatus for applying a band of material to the edge of a panel. The apparatus comprises a base plate, a hot melt adhesive gun mounted to the base plate with its longitudinal axis parallel with the plate, the hot melt adhesive gun having a discharge nozzle projectable beyond a transverse edge of the plate. An extrusion tip carried by said nozzle include orifice means defining a linear bead of melted adhesive at right angles to the panel, for edge application thereto. Means provide for relative pressure of the extrusion tip at the orifice means against the edge of the panel and means operatively press the band relatively against the panel edge at a point downstream of the area of contact of the hot melt adhesive with the panel edge; whereby, the adhesive becomes sticky prior to contact of the band with the adhesive coated panel edge and a controlled glue line is affixed to the panel edge with minimal waste of the adhesive. Further, the glue line is consistently applied to the edge without gumming up the finished product or the apparatus.

Preferably, the gun is mounted to the base plate for movement along the plate at right angles to the transverse edge and is spring biased with respect thereto so as to maintain relative spring biased contact between the orifice means of the extrusion tip and the panel edge to be coated when table mounted, The extrusion tip may comprise an L-shaped extrusion tube carried by the nozzle terminating in a vertical portion at right angles to the axis of the gun, the vertical portion carrying a series of sligned small diameter holes. A plunger threaded to the tube terminal portion, at the end thereof, remote from the nozzle functions to selectively close off the orifice holes to define the width of the linear bead of melted adhesive applied to the panel edge.

A table having a horizontal table top including a slot within a side edge thereof at right angles to the edge configured to the base plate may receive the base plate. Means mounted to one of the base plate and the table top fixedly lock the base plate to the table within the slot. The table further includes a vertical fence on the table top, to one side of the extrusion tip, for guiding the edge of the panel to be banded. The vertical fence is aligned with the extrusion tip such that the panel edge sweeps across the extrusion tip orifices during movement of the panel over the table top. The table top further comprises at least one roller mounted for rotation about a vertical axis to the opposite side of the extrusion tip from the vertical fence and aligned therewith, being spaced some distance from the extrusion tip orifices, such that the band moves across the table top, or edge and is sandwiched between the roller and the now tacky adhesive coated panel edge. The table top preferably carries a plurality of rollers mounted to the table top for rotation about vertical axis with their peripheries facing the panel. The rollers have their axes of rotation shifted along lines paralleling the axis of the hot melt adhesive applicator gun to conform to the thickness of the band and to adjust for an arcuate edge of the panel being banded. The base plate may carry at least one pressure roller or bar, if such exists, mounted for rotation about an axis parallel to the edge of the panel being banded and spring biased outwardly of the transverse edge of the base plate at a downstream position relative to the movement of the panel edge past the extrusion tip for spring biased contact with the band for pressing the band against the now tacky adhesive applied to the panel edge. Means may be mounted to the base plate to the side of the hot melt adhesive applicator gun opposite to that bearing the pressure roller for defining a band storage magazine and for guiding an end of the band across the back of the extrusion tip and across the front of the pressure roller positioned downstream of the extrusion tip in the direction of movement of the band and panel during band application to the edge of the panel. The magazine may comprise an open framework defined by a vertical wall of loop form. The base plate magazine loop wall may bear a band material hold down to the rear of the extrusion tip including a horizional portion overlying the upper edge of the band to guide the on edge band across the rear of the extrusion tip and into contact with said at least one pressure roller and wherein the gap between the base plate and that portion is slightly larger than the width of the band which passes therethrough.

BRIEF DESCRIPTION OF THE DRAWINGS

FIG. 1 is a top plan view of a hand held hot melt applicator gun type banding apparatus for banding a thin band to the edge of a panel, forming a preferred embodiment of the present invention.

FIG. 3 is a side elevational view, partially in section, of the apparatus of FIGS. 1 and 2.

FIG. 3A is a sectional view of a portion of the apparatus of FIG. 1 taken about line 3a—3a.

DESCRIPTION OF THE PREFERRED EMBODIMENTS

Figure 2:
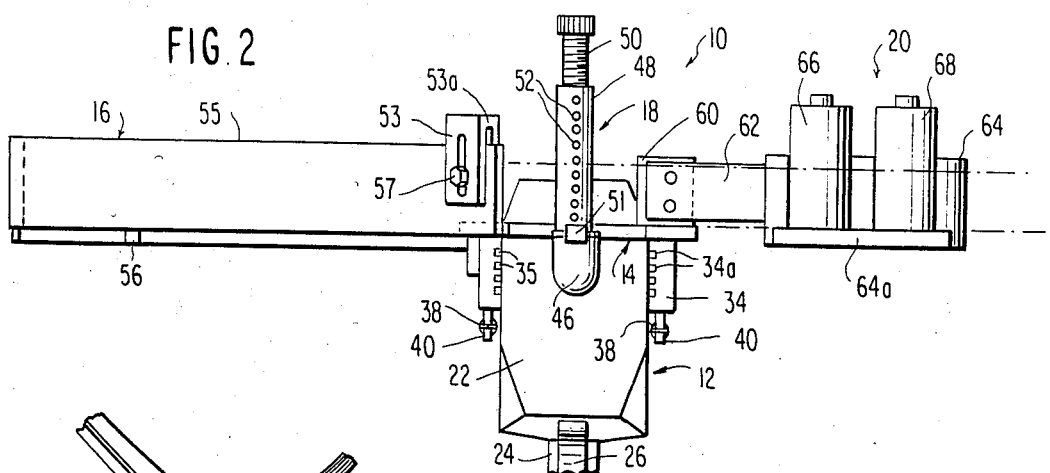
FIG. 2 is a front elevational view of the apparatus of FIG. 1.

Referring to the drawings, particularly FIGS. 1-3 inclusive, a first embodiment of the hot melt adhesive applicator gun type edge banding apparatus as a portable, hand held unit is indicated generally at 10 and comprises principally a commercially available hot melt adhesive applicator gun indicated generally at 12, a base plate indicated generally at 14, a strip or band material magazine indicated generally at 16, a specially formulated nozzle extrusion tip indicated generally at 18 and a pressure roller guide assembly indicated generally at 20.

The hot melt adhesive applicator gun 12 constitutes a commercially available unit such as that sold under the trademark POLYGUN II by the Minnesota Mining and Manufacturing Company of St. Paul, Minn. The applicator gun 12 is comprised of a large heater block 22 supported by a handle assembly 24 which underlies the block. The block includes a trigger 26 which is hinged thereto such that it is normally spring biased forwardly in a position functioning to shut off the flow of hot liquid adhesive outwardly of gun nozzle 28. The adhesive comes in solid form as cartridges which are fed into a chamber. Operation of the trigger functions to effect instantaneous hot melt liquefaction of the solid thermoplastic adhesive resin. The cylindrical solid thermoplastic adhesive resin material in cartridge form is fed to a heater within heater block 5 by a floating piston mechanism indicated generally at 30, allowing up to seven pounds of adhesive per hour to be extruded through the extrusion tip of extrusion nozzle 28. Insofar as the adhesive applicator gun 12 is concerned (or its replacement should the applicator take a form other than the commercial gun illustrated), the liquid adhesive is extruded through specially constructed extrusion tip 18 forming one of the primary components of the invention. Mounted to the applicator gun 12 and forming a further principal element of the banding apparatus is base plate 14.

Base plate 14 comprises a generally planar member which may be molded or otherwise formed of plastic material, metal or the like and which is of irregular form including a frontal or transverse portion 14a which spans across the front of the applicator gun 12 and, to the rear of which, project paired legs as at 14b defining a center opening as at 32. Thus, the base plate 14 is generally of U-shaped plan configuration defined by frontal transverse portion 14a and the laterally spaced, rearwardly directed legs 14b. Legs 14b fixedly mount a pair of guide bars 34 which extend along both sides of the applicator gun 12, in the illustrated embodiment and which are slidably mounted to respective sides of the heater block 22 by having slots 34a therein receiving ribs 35 on the sides of heater block 22.

The base plate 14 has a thickness of perhaps three-fourths of an inch, and the guide bars 34 contact the sides of the heater block 22 at positions such that the base plate 14 spans across the top of extrusion nozzle 28 of applicator gun 12. The guide bars 34 may be of metal and may be screwed, welded or otherwise permanently affixed to the bottom of base plate 14. The front edge of the base plate 14 is defined by a central scalloped edge portion 14c and oppositely directed rearwardly oblique portions 14d, to each side thereof. Projecting upwardly from the top of heater block 22, at the rear thereof, are fixed pins 36 to which one end of tension coil springs 38 are fixed. The opposite ends of the coil springs are connected to similar pins 40 fixedly carried by legs 14b of the base plate 14. Thus, gun 12 is continuously biased forwardly in the direction of extrusion tip 18 relative to base plate 14, riding on the guide bars 34.

As mentioned previously, the extrusion nozzle 28 of the applicator gun 12 terminates in a specially constructed and configured extrusion tip 18. Nozzle 28 receives an externally threaded short-length tube 44 which is threaded into the bore of nozzle 28. At its opposite end it is threaded into one end of elbow 46. The elbow 46 is of tubular construction including right angled halves and is internally threaded within the halves. It threadably receives the threaded end 48a of vertical extrusion tip barrel 48. Additionally, the interior of the extrusion tip barrel 48 is threaded. Mounted within the extrusion tip barrel 48 is an adjustment screw 50 which functions to adjustably close off or open a series of small circular holes or orifices 52 within the barrel 48. The orifices or holes 52 are vertically aligned longitudinally such that they define a possible adhesive extrusion path of a width corresponding to the arrow P. The width of the extruded hot melt adhesive forms a much smaller glue line P' however, as defined by the bottom of the screw 50 width. Thus, a tightly controlled glue line of a vertical height in FIG. 2 such as P' determined by the number of holes or orifices 52 which are open is extruded onto the vertical edge 54 of a panel or workpiece W whose edge 54 is to be banded. By use of the special extrusion tip 18, the controlled glue line wastes little of the glue and the glue line is consistently where it should be applied to the edge of the panel or workpiece W between its upper and lower surfaces and is prevented from gumming up the finished product or the machine. Depending upon the size of the orifices, one complete, or a series of spaced glue lines result.

In both embodiments, the floating mount achieved by guide bars 34, base plate 14 and the springs 38, insures consistent pressure between the adhesive or glue extrusion tip 18 and workpiece W to be edged, when the gun is table mounted.

In this preferred embodiment, strip material magazine 16 is an important element of the combination and is made integral with or mounts to the base plate 14, to one side of applicator gun 12 and purposely so. In that respect, since the applicator gun 12, forming the major weight element of the apparatus, weighs only several pounds, the strip or band material magazine 16 is purposely formed of a light weight open frame construction including an outside loop wall 54 which merges with or constitutes or abuts against the inclined edge portion 14d of base plate 14 at one end. The wall 54 is of general oval plan configuration and terminates at its opposite end in portion 54a which runs along the sidewall of applicator gun heater block 22 and which is fixed to that sidewall overlying base plate 14. Extending across the open loop and underneath wall 54 are a series of struts 56 of narrow strip form integrated to wall 54 at their ends. Coiled within the strip or band material magazine 16 is band or strip M, the free end of which due to its flexible and somewhat resilient nature, is pressed along the inside of the wall 54 and which passes to the rear of barrel 48 and outwardly beyond extrusion tip, absent contact with the workpiece or substrate W to be banded. A rectangular bar 55 defining a hold down, including a portion 55a overlying band M edge, is screw mounted to lie across the top of wall 54 by screw 57. In both embodiments, it is important that the strip or band M be applied against edge 54 of a workpiece such as workpiece W or its equivalent and be be pressed into contact with the wetted edge of the workpiece at some point downstream of the application point of the hot melt adhesive to that edge as defined by the series of orifices or holes 52 within barrel 48 of the extrusion tip, when the adhesive becomes tacky. In order to effect that operation, the apparatus 10 is provided with the pressure roller assembly 20.

In that respect, on base plate 14 to the opposite side of the extrusion tip 18 from the strip or band material magazine 16, there is mounted a swivel base 58. In the illustrated embodiment of FIGS. 1–3, the swivel base 58 is of block form and is fixedly mounted to the upper surface of base plate 14. It comprises an L-shaped member including a vertical flat spring supporting wall 60 facing the workpiece W and generally perpendicular to the longitudinal axis of the applicator gun 12. A flexible connector in the form of a metal strip leaf spring 62 has one end fixed to the vertical wall 60 of the swivel base 58 and its opposite end fixedly mounted to a pressure roller support block 64. Block 64 mounts in this embodiment a pair of pressure rollers 66 and 68 for rotation about their vertical axes perpendicular to the horizontal plane of support block 64. The pressure rollers 66 and 68 have their axis aligned such that by flexing of the flat spring 62, the rollers 66, 68 may contact the face of band M opposite that contacting the adhesive coated edge 54 of the workpiece W. The position of the swivel base 58, the length and configuration of the flexible connector or leaf spring 62, and the position of the rollers 66 and 68 are such that the initial contact between the strip or band M and the wetted edge 54 of the workpiece is at some distance downstream from the application point of the adhesive with edge 54 of the workpiece.

In the illustration of FIG. 1, the free hand of the operator holding handle 24 of apparatus 10 may press the support block 64, 70 along edge 64a thereof, to flex spring 62 and move the block 64 to the dotted line position 64' shown and rollers at 66' and 68' such that the upstream roller 68 determines the initial contact point for the band M with respect to the previously wetted edge 54 of the workpiece W. The distance D between those points represents, in terms of the normal manual applicator speed movement of the apparatus 10 relative of the workpiece W, the time necessary for the adhesive to become tacky prior to contact of the band M with that adhesive. It should be understood that if a workpiece W constitutes a panel having a relatively straight edge as the apparatus applies the adhesive and the band to the vertical edge of the workpiece (when the applicator is held horizontally), the metal strip spring 62, given the bend shown, is sufficient to exert a fair amount of biasing force against the band M to press rollers 66, 64 into contact with the outside surface of band M and press the inside surface of the same band M (relative to the workpiece W) against the adhesively coated edge 54 of the workpiece M. Additionally, as a table mounted implement, since the applicator supports the base plate under a floating relationship, the applicator gun 10 when contacting the edge 54 of the workpiece W, effectively is moved back against the bias of springs 38, utilizing the force of these springs to bias the pressure rollers 66 and 68 into contact with the strip or band M if employed, and conversely the strip or band M into contact with the workpiece edge 54 downstream of the line of initial extrusion of the adhesive against that edge, as seen hereinafter.

To function properly, the hot glue or extrusion tip 18 should contact the workpiece or substrate material and at that exact point the tip and substrate should form a "die" with the hot melt adhesive actually pressured into the substrate and forming a distinct pattern on the surface of the substrate. A single line or multiple line pattern may be achieved, depending upon the size and spacing of the orifices. The aligned pattern of adhesive maintains itself until flattened between the strip or band and the workpiece W by pressure rollers 66, 68. This results in the advantages of a good glue-to-substrate penetration, with regulated thickness delivering an unnoticeable glue line in the finished product. Utilizing the flexible connector or metal spring 62, the pressure rollers 66, 68 may be adjusted for either various thicknesses of edges or for applying an edge to a curved surface. The finished product is characterized by a thin glue line with heavy glue coverage to resist moisture penetration in the finished product, with overall reduction in glue consumption and by the elimination of product clean-up or the necessity of excess band removal along the edges of the product subsequent to bonding of the strip or band to that panel edge.

Figure 4:
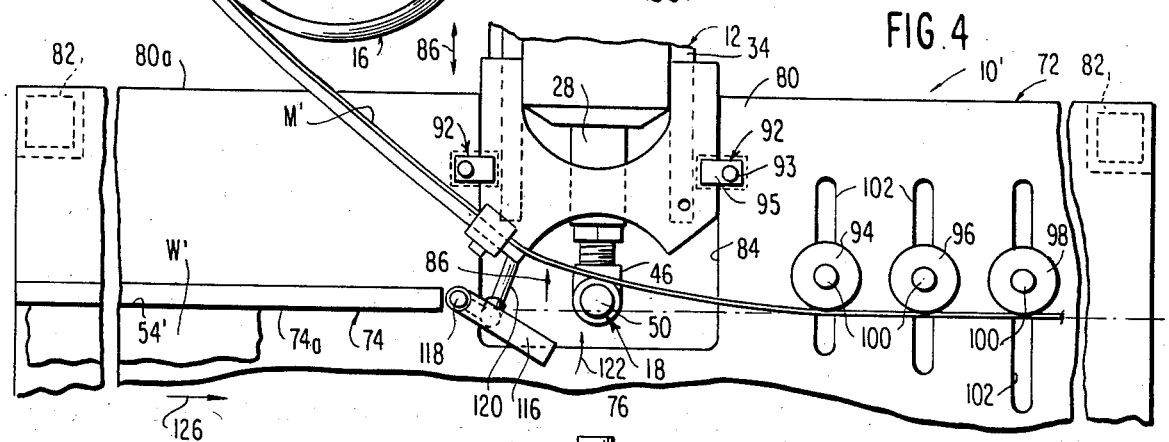
FIG. 4 is a top plan view of the apparatus of FIGS. 1-3, in modified form and incorporated into a table top as an alternative embodiment of the present invention.
Figure 5:
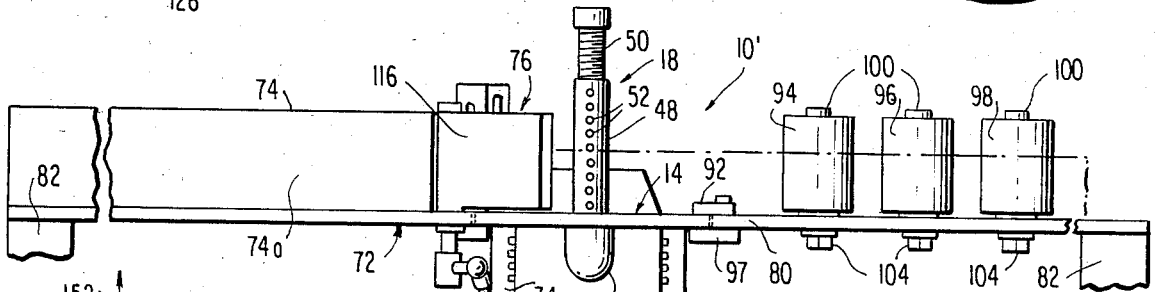
FIG. 5 is a front elevational view of the embodiment of the invention of FIG. 4.
Figure 7:
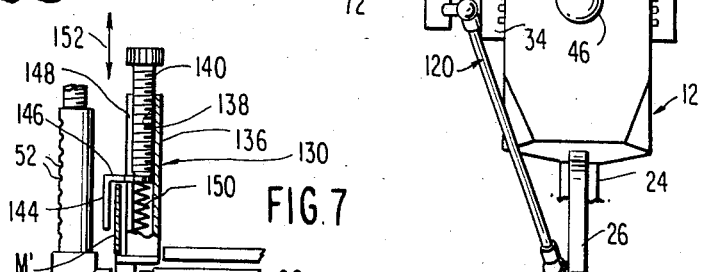
FIG. 7 is a sectional view of a portion of the apparatus of FIG. 6 taken about line 7—7, forming a further embodiment of the present invention.
Figure 6:
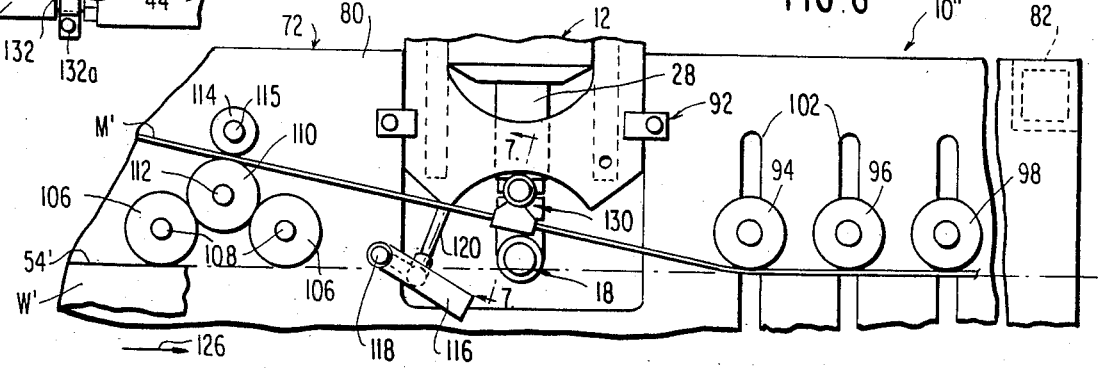
FIG. 6 is a plan view of a portion of a modified form of a table top mounted apparatus defining a further embodiment of the present invention.

Referring next to FIGS. 4 and 5, a second embodiment of the invention is illustrated using the prior embodiment 10, as modified and incorporated into a table construction which includes additional elements to form a fixed machine rather than a hand held portable implement. In the second embodiment, like elements to the embodiment of FIGS. 1–3 bear like numerical designations. The main components of apparatus 10' are the commercially available hot melt adhesive applicator gun 12, base plate 14, the specially configured and structured adhesive extrusion tip 18, as well as band material magazine 16. The pressure roller guide assembly 20 may be dispensed with and equivalent means provided as table borne elements, as shown Additional principal components of the apparatus comprise a table indicated generally at 72, a vertical workpiece or panel guide fence indicated generally at 74, a workpiece or panel trigger actuator mechanism indicated generally at 76, and table mounted pressure roller assembly indicated generally at 78.

The table 72 functions to physically support and fixedly mount the base plate 14 and to support a workpiece or panel W for movement horizontally across the upper surface of a table top 80 upon which the base plate 14 is mounted. The table 72 is shown in simplified form and consists of a horizontal table top 80 supported by legs 82 at the four corners thereof. Table top 80 is provided with a rear vertical edge 80a and the top includes a rectangular slot 84, from edge 80a, inwardly thereof and at right angles to that rear edge. Slot 84 is of a width generally on the order of or slightly larger than the width of the heater block 22, such that the gun 12 mounted therein may move longitudinally and bidirectionally, as shown by arrow 86, at right angles to the longitudinal axis of the elongated table top 80. That movement is permitted, due to the slidable mount between mounting brackets or bars 34 and heater block 22. Quick connect mechanisms 92 fixedly mounted to the base plate 14 permit the base plate 14 to be detachably mounted to the table top 80 in the location shown in FIGS. 4 and 5.

In the second preferred embodiment, the matrix magazine 16 is mounted to the side of gun 12 via plate 14 and carries in identical fashion to the prior embodiment a band M of strip material for application to the edge of the workpiece or panel W. Additionally, the nozzle 28 of the gun 12 bears the identical extrusion tip 18 to that of the prior embodiment, and the only modification made to the prior embodiment for table mount incorporation as a stationary machine, is the elimination of the pressure roller assembly 20. In that respect, the swivel base 58 is shown as fixedly mounted to the base plate 14 to the right of the nozzle extrusion tip 18, FIG. 4. However, the flexible connector or leaf spring 62, the support block 64, and rollers 66 and 68 have been removed.

The balance of the components of this embodiment are mounted to the table top 80. To the left of the extrusion tip 18, upright, vertical guide fence 74 is comprised of a solid metal strip which is welded or otherwise affixed to the table top. The table top 80 may be of metal. However, it could be of wood, in which case, screws or bolts may be employed for fixing the vertical fence in the position and orientation shown. The fence 74 is mounted parallel to the rear edge 80a of the table top 80 and terminates to the left of the extrusion tip 18. Fence front surface 74a is generally in line with the front of extrusion tip barrel 48 bearing the vertical array of small diameter holes or orifices 52, as in the prior embodiment.

To the right of extrusion tip barrel 48, FIGS. 4 and 5, there are provided three pressure rollers 94, 96 and 98. All are of the same diameter and mounted on vertical axles or pins 100. The table top 80 is provided with parallel straight slots 102 through which project the axles 100. The axles 100 include clamping means 104 at their bottoms for locking the axles 100 at predetermined position axially within slots 102. The adjustment slots 102 permit the pressure rollers 94, 96 and 98 to be aligned in a straight row with the peripheries of the rollers aligned with the outer surface 74a of the guide fence 74 and with the leading edge of the extrusion tip barrel 48, where the workpiece or panel W has a straight edge, as shown, but spaced rearwardly therefrom by the thickness of band M'.

Alternatively, the workpiece W may comprise a member having an arcuate edge configuration, in which case the pressure rollers 94, 96 and 98 may be shifted within the in adjustment slots 102 and locked at given positions corresponding to the edge configuration of the workpiece W to be banded.

As shown in dotted lines, the guide fence 74 may be replaced by paired rollers 106 defining stops for the edge of the workpiece W in contact therewith, the rollers 106 being mounted for rotation about their axes by means of upright axles 108. Additionally, a third roller of similar size, as at 110, may be mounted for rotation about its axis on table top 80 through a vertical upright axle or rod 112 with its periphery in contact with the peripheries of rollers 106 such that by movement of the workpiece W along the feed path, as defined by the peripheries of rollers 106, the roller 110 is frictionally driven. Additionally, a fourth smaller diameter roller 114 may define with roller 110 a feed path for a band M' shown in dotted line and fed by being nipped between rollers 110 and 114, across the surface of the table top 80. The band M' on edge passes behind the extrusion tip 18 in the manner of the prior embodiment, prior to being pressed against the edge of the workpiece W by the succession of pressure rollers 94, 96 and 98. Roller 114 may have its periphery spacing biased into contact with the surface of band M'.

In this embodiment, in order to control the flow of hot melt adhesive from the orifices or holes 52 of the extrusion tip barrel 48, a workpiece operated trigger actuator 76 is operatively connected to trigger 26 of the adhesive applicator gun 12. In that respect, the trigger actuator mechanism 76 comprises a pivotable lever 116 which is pivoted to the end of the guide fence 74 by hinge means 118. Additionally, by linkage 120, the lever 116 is mechanically coupled to trigger 26 such that the panel pivots the lever in the direction of the arrow 122, counterclockwise, FIG. 5. Trigger 26 is then depressed towards handle 24 of the gun to initiate the flow of hot melt adhesive through the extrusion tip barrel orifices 52 and against the edge 54' of straight edge workpiece W'. The application of the adhesive is well upstream of the first pressure roller 94.

Unlike the prior embodiment, the mounting of the base plate 14 to the table top 80 is such so as to normally position the extrusion tip barrel 48 slightly beyond the plane defined by either guide fence 74 and rollers 94, or paired rollers 106 and roller 94 of the pressure roller assembly. When the operator places a workpiece or panel W' flat upon the table top 80, with its edge 54' in contact initially with the face 74a of the guide fence 74 for the peripheries of rollers 106, and moves the workpiece from left to right, as indicated by arrow 126, the workpiece in contacting the extrusion tip barrel 48 forces the gun to move backwards slightly as per arrow 86 against the bias of the tension coil springs 38 to insure proper pressure of the extrusion tip barrel 48 at the point where the orifices 52 face edge 54' of the workpiece into contact therewith.

Referring to FIGS. 4 and 5, as an alternative to providing a band or strip material hold down 55 mounted to material magazine wall 54, a hold down and guide assembly indicated generally at 130 may be mounted to cylindrical nozzle 28 intermediate of the hot melt adhesive applicator gun heater block 22 and the extrusion tip 18. The assembly comprises a C clamp 132 which encircles nozzle 28 and which includes a knurled tightening screw 134 for frictionally locking the clamp 132 to the periphery of nozzle 28. Extending upwardly from the top of clamp 132 is a hollow tubular member 136 which is threaded internally as at 138 and which receives, from the top, the threaded end of a thumb screw 140. An inverted L-shaped material catch 142 includes a vertical portion 144 projecting downwardly from base 146. The inboard end of base 146 rides within a narrow slot 148 extending vertically within the tubular member 136 facing the extrusion tip 18. The base 146 terminates in a circular disc portion carried within tubular member 136, which abuts the lower end of the thumb screw 140 and is maintained in abutment by a compression spring 150 interposed, internally, between the base member and clamp 132. Thus, as the thumb screw 140 is rotated one way or the other, material catch 142 will move upwardly or downwardly as indicated by arrow 152 and thus position the material catch 142 at a higher or lower level. The band M' is therefore captured and maintained in an on-edge orientation passing behind the extrusion tip and guided into contact with the adhesive coated edge 54 or 54' of the workpiece W or W' respectively at a point downstream from the initial contact of the hot melt adhesive and that panel edge. The same type of structure without clamp 132 could be fixedly mounted to base plate 14 and constitute the strip material hold down at the juncture of the wall 54 of magazine 16 with base plate inclined edge portion 14d.

Various modifications may be made to the apparatus in either embodiment form. For instance, single pressure rollers may be employed downstream of the point of hot melt adhesive application to the panel edge. A non-rotatable bar may be employed instead of a pressure roller, or rollers under some circumstances, for instance mounted to leaf spring 62 and flexed into contact with the band for pressing the band against the edge of the panel remote from the point of hot melt adhesive application. The band or length of strip material to be applied, depending upon its flexibility, may be stored in coiled form within the material magazine. Alternatively, it may be positioned on edge on the table top 80a, fed into confronting position between the pressure roller (or pressure bar) for pressing of its leading end against the edge of the panel to be banded and fed by friction during relative movement of the apparatus and the workpiece or panel being banded or edge trimmed.

In both embodiments, the hot melt adhesive or glue extrusion tip 18 contacts directly the edge of the panel forming the substrate material and at that exact point, the tip and substrate function to form a "die" with the hot melt adhesive actually pressured into the substrate and forming a distinct pattern on the surface of the substrate, i.e., line pattern defined by closely spaced small diameter holes or orifices, the line pattern maintaining itself until flattened between the band and panel edge by the pressure rollers.

Advantageously, good glue substrate penetration occurs, and the glue line is of regulated thickness to produce an unnoticeable glue line at the bond in the finished product. The distance between the glue line application and the initial contact of the pressure roller or rollers with the band and the sandwiching of that band between the pressure rollers and the panel edge promotes the capture of the band to the substrate. The pressure rollers in the table incorporated apparatus are adjustable for either various thicknesses of the edges or for applying an edge to a curved surface. The extrusion tip permits a varying width glue line, a thin glue line on the finished product, sufficiently heavy glue or adhesive coverage to resist moisture penetration in the finished product and results in a high integrity bond with reduced glue adhesive consumption and minimal product clean up. Since the gun is mounted to the table on a floating mount, this pressures the tip forward to assure continuous tip to substrate contact and continuous glue application.

The hand held apparatus features a material magazine which facilitates self feed of the band and utilizes edge guides that can quick connect/disconnect to the table for forming a stationary machine.

Further alternate embodiments of the invention involve rotation of barrel 48 such that the orifices 52 face rearwardly away from the panel edge so that the hot melt adhesive is extruded onto the face of the band M or M' as it passes behind the extrusion tip 18. The material hold down as for instance assembly 130 may be mounted immediately to the rear of the extrusion tip barrel 48 on nozzle 28 or elbow 46 of the extrusion tip to insure the guiding of the material along a proper path to the rear of the extrusion tip and to create the necessary space between the band at the point of adhesive application and the edge of the panel to which the band is to be adhesively bonded. This gives the time necessary for the adhesion to become tacky prior to the band being presssed against the edge of the panel at some point downstream of adhesive application to the band. Further, the material hold down could be upstream in terms of band movement from the contact point of the band with the extrusion tip 18 as it sweeps past the orifices on the back side of the extrusion tip relative to the edge of the panel.

Further, the extrusion tip itself could carry a hold down at a fixed or variable height relative to elbow 46 which underlies and supports the lower edge of the on edge band passing to the rear of the extrusion tip.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for adhesively applying a major surface of a band of material to an edge surface of a panel, said apparatus comprising:
    a base plate having a bottom,
    a hot melt adhesive gun,
    means for mounting said gun to the base plate with its longitudinal axis parallel to the bottom of the base plate,
    said hot melt adhesive gun having a discharge nozzle projecting beyond a transverse edge of the plate,
    an extrusion tip carried by said nozzle at right angles to the plane of the base plate, and including orifice means defining a linear bead of melted adhesive at right angles to the panel for application to one of a panel edge between the top and bottom surfaces of the panel defining said edge, and said band when on edge and presented thereto,
    means operatively coupled to said base plate for pressing said band against said panel edge at a point downstream of the area of contact of the adhesive with the panel edge;
    a band storage magazine mounted to said base plate, laterally to the side of said extrusion tip opposite that side facing said means for operatively pressing the band relatively against the panel edge downstream of the area of initial contact of the hot melt adhesive with said panel edge;
    said magazine including means for storing said band on edge for feed from the magazine,
    upright guide means carried by said plate adjacent the extrusion tip for guiding said on edge band into upright surface contact with said extrusion tip and for upright surface contact with said pressing means downstream of said extrusion tip; and
    means for selectively causing said orifice means to face one of said contacting surface of said on edge band and said panel edge surface, such that a controlled glue line is affixed to the panel edge or said upright band major surface with minimal waste of adhesive; the glue line is consistently applied with uniform thickness without gumming up the finished product or the banding apparatus and wherein the adhesive becomes sticky prior to contact of the band with the panel edge downstream of said extrusion tip;
    and wherein said means mounted on said base plate for guiding said band and said panel along predetermined converging paths comprises a plurality of rollers mounted for rotation about axes parallel to the planes of movement to the major surface of the band and the edge surface of the panel, said rollers having respective peripheral surfaces in contact with each other and engaging respectively the edge surface of the panel and the major surface of the band so that forcibly moving the edge surface of the panel in contact with one of the rollers causes another of the rollers to drive the band of material in the same direction and at the same velocity.

2. The apparatus as claimed in claim 1, wherein; said extrusion tip comprises an L-shaped extrusion tube carried by said nozzle open to the interior of said nozzle, said extrusion tip terminates in a vertical portion at right angles to the axis of the gun, said vertical portion carries a series of closely spaced longitudinally aligned small diameter holes forming said orifice means and defines at least one bead of melted adhesive, a plunger threaded to the end tube of terminal portion and projecting internally of the extrusion tube selectively closes off the orifice holes by rotation thereof to vary the number of beads of melted adhesive applied to the panel edge.

3. The apparatus as claimed in claim 1, wherein said magazine comprises an open framework defined by a vertical wall of loop form within which the band is coiled, one end of said loop form wall is fixed to said base plate along said transverse edge, the other end of said wall is fixed to said base plate along the side of the hot melt applicator adhesive applicator gun, said wall ends define a gap through which the band passes and said apparatus includes a band material hold down overlying said on edge band to the rear of the extrusion tip for guiding said band across the rear of said extrusion tip and into contact with said means for operatively pressing the band against the panel edge at a point downstream of the area of initial contact of the hot melted adhesive with the panel edge, and wherein the gap between said base plate and said portion of the hold down is slightly larger than the width of the band which passes therethrough.

4. The apparatus as claimed in claim 3, further comprising a table including a horizontal table top, said table top having a slot within an edge thereof at right angles thereto, said slot being configured to the hot melt adhesive applicator gun and receiving a portion of said gun, such that said base plate contacts said table top to each side thereof, means for fixedly locking said base plate to said table top, vertical guide means on said table top to one side of said extrusion tip for guiding an edge of a panel to be banded when slid in face confronting position with the table top along said vertical guide means, said vertical guide means being aligned with the extrusion tip such that the panel edge sweeps across the extrusion tip orifices during movement over the table top and said table top further comprising at least one roller mounted for rotation about a vertical axis on said table top and to the opposite side of said extrusion tip from the vertical guide means and being generally aligned therewith and being spaced some distance from the extrusion tip orifices, such that said band, as it moves across the table top on edge, is sandwiched between said at least one pressure roller and the adhesive coated panel edge after the adhesive becomes tacky, and wherein said base plate is mounted to said table top at a position such that as the panel edge contacts the extrusion tip, it shifts the gun rearward against the spring bias to maintain a predetermined pressure of the extrusion tip against the panel edge to insure uniform adhesive coating of said panel edge.

5. The apparatus as claimed in claim 4, wherein said at least one pressure roller comprises a plurality of rollers mounted to said table top for rotation about vertical axes with their peripheries facing the panel, and wherein said table top includes a series of aligned slots, one for each of said rollers, said rollers are rotatably mounted on rods projecting through said slots for rotating about through axis, and said rods carrying means for clamping said rods to said table top at varying positions along said slot such that said rollers may conform to the thickness of said band and to any curvature provided to the edge of the panel being banded.

6. An apparatus for adhesively applying a band of material to the edge of a panel, said apparatus comprising:
   a base plate having a bottom,
   a hot melt adhesive gun,
   means for mounting said gun to the base plate with its longitudinal axis parallel to the plate bottom,
   said hot melt adhesive gun having a discharge nozzle projecting beyond a transverse edge of the plate,
   an extrusion tip carried by said nozzle and including orifice means defining a linear bead of melted adhesive at right angles to the panel for application to the panel edge between top and bottom surfaces of the panel defining said edge,
   means operatively mounted to said base plate for pressing said band against said panel edge at a point downstream of the area of contact of the adhesive with the panel edge,
   a band storage magazine mounted to said base plate to the side of said extrusion tip opposite that bearing said means for operatively pressing the band relatively against the panel edge at a point downstream of the area of initial contact of the hot melt adhesive with said panel edge; and
   said magazine including means for storing said band on edge for feed behind said extrusion tip and into contact with said pressing means;
   wherein said means for mounting said gun to said base plate comprises means for mounting said gun to effect movement of the gun relative to its longitudinal axis to shift said extrusion tip orifice means outwardly of said base plate transverse edge or to retract it relative to the same, and said apparatus further comprises means for spring biasing said base plate relative to said gun, and wherein said means for operatively pressing the band relatively against the panel edge at a point downstream of the area of initial contact of the hot melt adhesive with the panel edge comprises a pressure member, and means for operatively mounting said pressure member to said base plate for movement towards and away from said gun such that said pressure member may be shifted relative to said gun to follow said panel edge.

7. The apparatus as claimed in claim 2, further comprising a table including a horizontal table top, said table top having a slot within an edge thereof at right angles thereto, said slot being configured to the hot melt adhesive applicator gun and receiving a portion of said gun, such that the base plate contacts said table top to each side thereof, means for fixably locking said base plate to said table top, vertical guide means on said table top to one side of said extrusion tip for guiding an edge of a panel to be banded when slid in face confronting position with the table top along said vertical guide means, said vertical guide means being aligned with the extrusion tip such that the panel edge sweeps across the extrusion tip orifices during movement over the table top, and said table top further comprises at least one roller mounted for rotation about a vertical axis on the table top and to the opposite side of said extrusion tip from the vertical guide means and being generally aligned therewith and being spaced some distance from said extrusion tip orifices such that said band as it moves across the table top on edge, is sandwiched between said at least one pressure roller and the adhesive coated panel edge after the adhesive becomes tacky, wherein said base plate is mounted to said table top at a position such that as the panel edge contacts the extrusion tip, said panel edge shifts the gun rearward against the spring bias to maintain a predetermined pressure of the extrusion tip against the panel edge to insure uniform adhesive coating of said panel edge, and wherein said vertical guide means comprises at least one roller mounted for rotation about its axis perpendicular to the table top, and positioned so as to be driven by edge contact of said panel as said panel moves towards the extrusion tip, and a pair of further rollers mounted for rotation about vertical axes, sandwiching said band in edge upright position and with one of said rollers in peripheral contact with the roller defining said vertical guide means, and wherein said rollers are of such diameter that the upright, on edge band is moved at the same velocity of the panel and is driven by the panel in the direction of the extrusion tip to facilitate adhesive bonding of the band to the panel edge downstream of the extrusion tip.

8. The apparatus as claimed in claim 6, wherein said extrusion tip comprises an L-shaped extrusion tube carried by said nozzle, open to the interior of said nozzle, said extrusion tip terminating in a vertical portion at right angles to the axis of the gun, said vertical portion carrying a series of closely spaced longitudinally aligned small diameter holes forming said orifice means and defining at least one bead of melted adheisve, a plunger threaded to the tube terminal portion and projecting internally of the extrusion tube to selectively close off the orifice holes by rotation thereof to vary the number of beads of melted adhesive applied to the panel edge.

9. The apparatus as claimed in claim 6, wherein a block member is mounted to said base plate proximate to said transverse edge thereof, a leaf spring is fixed at one end to said base plate, a support block is fixedly mounted to the opposite end of said leaf spring, and at least one pressure member is mounted on said support block, and at an edge thereof, for movement into contact with the face of said band to the side opposite that facing said adhesive coated panel edge; whereby, by flexure of said leaf spring, said at least one pressure member presses the band into contact with the edge of said panel for adhesive bonding thereto.

* * * * *